May 23, 1933.  O. A. WIBERG ET AL  1,910,943

METHOD OF MANUFACTURING TURBINE BLADES

Filed July 9, 1931  2 Sheets-Sheet 1

Inventors:
Oscar A. Wiberg,
John Nordin,
By Sommers & Young Attys.

May 23, 1933. O. A. WIBERG ET AL 1,910,943
METHOD OF MANUFACTURING TURBINE BLADES
Filed July 9, 1931 2 Sheets-Sheet 2
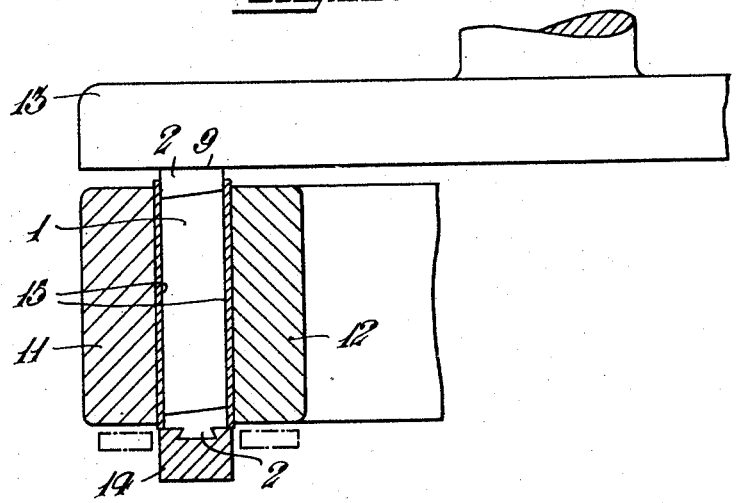
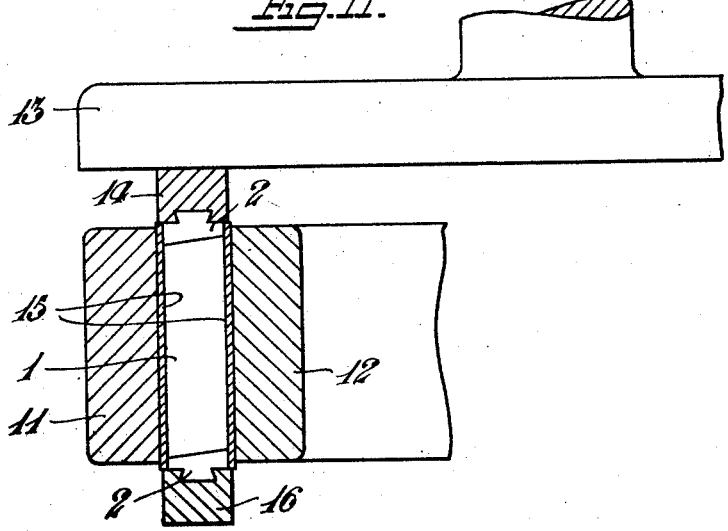
Inventors:
Oscar A. Wiberg
John Nordin
By Sommers & Young
Attys.

Patented May 23, 1933

1,910,943

UNITED STATES PATENT OFFICE

OSCAR ANTON WIBERG AND JOHN NORDIN, OF FINSPONG, SWEDEN

METHOD OF MANUFACTURING TURBINE BLADES

Application filed July 9, 1931, Serial No. 549,754, and in Sweden April 29, 1930.

This invention relates to the manufacture of turbine blades of the type having a laterally projecting integral root at each end.

The object of the invention is to render the manufacture of such blades as well as of rings or drums of such blades simple and cheap.

According to the invention the blank to be transformed in a blade is first subjected to one or more pressing operations so as to form said projecting roots, the surface of the blade situated between said projecting roots as well as the associated inner surfaces of the roots being finished by said pressing operation, whereas the remaining surfaces of the blades are only roughly pressed, the rough product thus obtained being then subjected to a series of milling operations and the like in order to finish said remaining sides. Because of the fact that the surface of the blade situated between the projecting portions of the roots is more difficult of access than the remaining surfaces of the blade it is evident that by thus directly giving this surface its finished form a considerable simplification of the finishing of the blade may be obtained.

Figure 1:
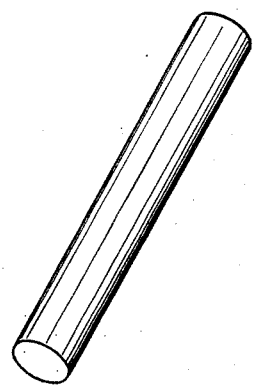
Figure 2:
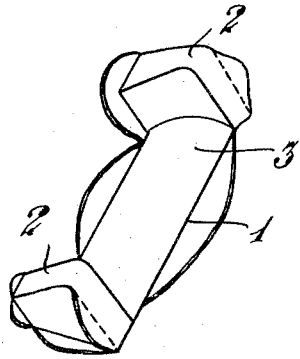
Figure 4:
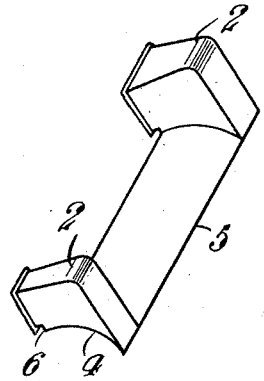
Figure 3:
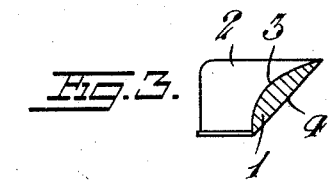
Figure 5:
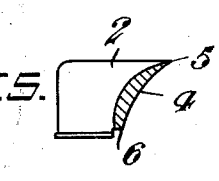
Figure 6:
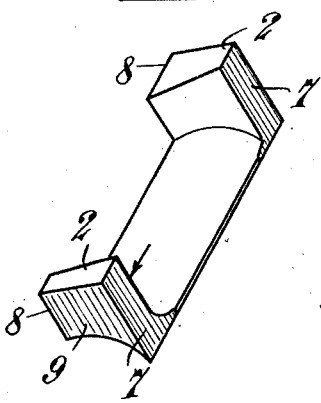
Figure 8:
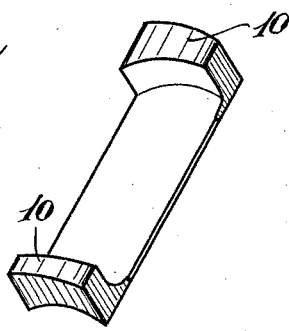
Figure 7:
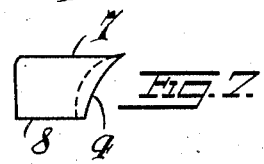
Figure 12:
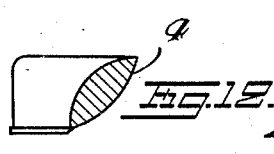
Figure 13:
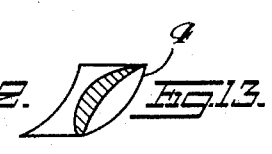

In the accompanying drawings Figs. 1–9 illustrate the various stages of manufacturing a blade according to this invention. Fig. 1 is a perspective view of a blank piece, and Figs. 2, 4, 6, 8, and 9 are perspective views of the blade as seen in its various stages of development. Fig. 3 is a cross section of the blade shown in Fig. 2 after removal of the burs. Fig. 5 is a cross section of the blade shown in Fig. 4, and Fig. 7 is a cross section of the blade according to Fig. 6. Figs. 10 and 11 are plan views, partly in section, of an auxiliary device for use in assembling the blades to form a blade ring or drum. Figs. 12 and 13 are sections corresponding to those shown in Figs. 3 and 5, respectively, but relating to a blade of modified form.

In the drawings, the invention is illustrated as applied to the manufacture of blades of the type in which the blade is convex on its one side and concave on its opposite side and in which roots formed integrally with the blades are provided which extend beyond the convex side of the blades. It is to be noted, that, of course, the invention is not restricted to this special type of blades.

As blank for the manufacture of blades according to this invention we use steel in the shape of a bar of appropriate section, for instance, a round bar, as shown in the drawings. Said bar is cut to pieces of the desired length. In Fig. 1 such a piece is shown. By subjecting said piece to one or more pressing operations it is then given the shape shown in Fig. 2, that is to say, the roots 2, 2 will be produced and the surface 3 of the blade 1 situated between the projecting roots, which in the example shown should be convex, will be given its finished form, whereas the opposite surface 4 of the blade which in the example shown should be concave is pressed to plane shape, as shown in Fig. 3, and the remaining surfaces are likewise roughly pressed. The blade thus pressed is then hardened and cleaned and the burs removed. The following stage of the operation involves milling of the surface 4 to the desired concave shape, the blade resting in said milling operation on the surface 3 to enable fixing of the thickness of the blade. At the same time the edges of said surface are milled to straight form, as shown at 5 and 6, Figs. 4 and 5, thereby determining the width of the blade. The operation next following involves milling of the surfaces 7, 8 of the roots 2 as well as the end surface 9 of one root, Fig. 6, to plane shape. The milling of the end surface 9 has for its object to fix the thickness of said root in the longitudinal direction of the blade so that all of the blades adapted to be assembled to a ring or drum may present one root of equal thickness. In said milling operation the blade is supported at the inner surface of the respective root, as indicated by the arrow in Fig. 6.

The roots 2 are adapted to serve as distance pieces of the assembled blade ring or drum, and to this end their surface remote from the concave surface should be of a convex form corresponding to the concave surface 4 of the adjacent blade. To this end the said surface may be subjected to a milling operation, and after this operation is completed the blade will have the appearance shown in Fig. 8, where 10, 10 indicate the convex surfaces of the roots obtained as result of said milling operation. After having been ground or cleaned (Fig. 9) the blade will be ready for insertion into the blade ring or drum.

Figure 9:
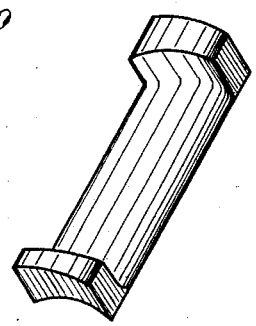

The assembling of blades of the shape shown in Fig. 9 to form a blade ring may, preferably, be effected in the following way:

The blades are placed in the relative positions they should have in the blade ring, and in effecting this placing the ground end surface 9 of the blades enables a proper relative adjustment of the blades in their longitudinal direction. In Figs. 10 and 11 auxiliary means are shown to be used in assembling the blades to form a blade ring of a radial flow turbine. The blades are placed in the desired relative positions between clamping rings 11, 12 and clamped with their ground end surfaces 9 placed against the face plate 13. The ends of the blades projecting beyond the clamping rings are then turned so as to form dove-tails, a ring 14, Fig. 10, so called strengthening ring, presenting a corresponding dovetail groove being brought into engagement with the roots and sealed in this engagement by a rolling or pressing operation. When this strengthening ring is wider than the blades, as is usually the case, then washers in the shape of split sheet metal rings 15 are placed between the clamping rings and the blades, said washers having a thickness corresponding to the difference in width in order to enable the removal of the blade ring from the clamping rings. After the strengthening ring 14 has been sealed in the way described the clamping rings with the blades are turned so as to bring the ring 14 into engagement with the face plate 13. After the clamping rings have been fixed in this position, dovetails are formed in the ground roots now exposed, and a strengthening ring 16 is then brought into engagement with said dovetails and sealed thereto by a rolling or pressing operation.

As already mentioned, the use of the sheet metal rings or washers 15 will allow an easy removal of the finished blade ring from the clamping rings. After removal of the washers the blade ring is ready for insertion into the turbine.

It is stated above that the surface 4 of the blade ring remote from the convex surface is pressed to plane shape, and that in the milling operation then following the surface is transformed to concave shape along its entire length. It is to be noted, however, that said surface may also be pressed to convex shape as shown in Fig. 12, and that in the subsequent milling operation part of the convex surface may be left intact at each end of the blade to form distance pieces, as will appear from Fig. 13.

What we claim is:—

1. A method of manufacturing a turbine blade which comprises subjecting a blank to a pressing action of such a nature as to form integral roots at both ends of the blank laterally projecting to one side thereof, to give the surface of the blank situated between said projecting roots its final shape, and to roughly form the remaining surfaces of the blade, and subjecting the surface of the blade opposite to the surface finished by the pressing operation to a milling operation, while causing the blade to rest upon said finished surface.

2. A method of manufacturing a turbine blade which comprises subjecting a blank to a pressing action of such a nature as to form integral roots at both ends of the blank laterally projecting to one side thereof, to give the surface of the blank situated between said projecting roots its final shape, and to roughly form the remaining surfaces of the blade, subjecting the surface of the blade opposite to the surface finished by the pressing operation to a milling operation, while causing the blade to rest upon said finished surface, and at the same time milling the longitudinal edges of said surface to fix the width of the blade.

3. A method of manufacturing a turbine blade which comprises subjecting a blank to a pressing action of such a nature as to form integral roots at both ends of the blank laterally projecting to one side thereof, to give the surface of the blank situated between said projecting roots its final shape, and to roughly form the remaining surfaces of the blade, subjecting the surface of the blade opposite to the surface finished by the pressing operation to a milling operation, while causing the blade to rest upon said finished surface, at the same time milling the longitudinal edges of said surface to fix the width of the blade, and milling the end surface of one root to plane form, while causing the blade to rest on the inner surface of said root in order to fix the longitudinal dimension of the root.

4. A method of manufacturing a turbine blade which comprises subjecting a blank to a pressing action of such a nature as to form integral roots at both ends of the blank laterally projecting to one side thereof, to give the surface of the blank situated between said projecting roots its final shape, to give the opposite surface of the blank a plane form, and to roughly form the remaining surfaces of the blade, and subjecting said opposite surface to a milling operation, while causing the blade to rest upon said finished surface.

5. A method of manufacturing a turbine blade which comprises subjecting a blank to a pressing action of such a nature as to form integral roots at both ends of the blank laterally projecting to one side thereof, to give the surface of the blank situated between said projecting roots its final shape, to give the opposite surface of the blank a convex shape, and to roughly form the remaining surfaces of the blade, and subjecting said opposite surface to a milling operation, while causing the blade to rest upon said finished surface.

6. A method of manufacturing a turbine blade which comprises subjecting a blank to a pressing action of such a nature as to form integral roots at both ends of the blank laterally projecting to one side thereof, to give the surface of the blank situated between said projecting roots its final shape, to give the opposite surface of the blank a convex form, and to roughly form the remaining surfaces of the blade, causing the blade to rest upon said finished surface, and subjecting said opposite surface to a milling operation, while leaving the end portions of the surface intact.

7. A method of manufacturing a turbine blade ring which comprises providing blades having integral roots at both ends, including milling the end surface of one root to plane form, placing the blades between clamping rings in the desired relative position, bringing the milled end surfaces in engagement with a face plate, producing dovetails or the like on the exposed roots, bringing a strengthening ring in engagement with said dovetails, and sealing the strengthening ring in said engagement by a rolling or pressing operation.

8. A method of manufacturing a turbine blade ring which comprises providing blades having integral roots at both ends, including milling the end surface of one root to plane form, placing the blades between clamping rings in the desired relative position, inserting washers between the clamping rings and the blades, bringing the milled end surfaces in engagement with a face plate, producing dovetails or the like on the exposed roots, bringing a strengthening ring in engagement with said dovetails and sealing the strengthening ring in said engagement by a rolling or pressing operation.

9. A method of manufacturing a turbine blade ring which comprises providing blades having integral roots at both ends, including milling the end surface of one root to plane form, placing the blades between clamping rings in the desired relative position, inserting split sheet metal rings between the clamping rings and the blades, bringing the milled end surfaces in engagement with a face plate, producing dovetails or the like on the exposed roots, bringing a strengthening ring in engagement with said dovetails, and sealing the strengthening ring in said engagement by a rolling or pressing operation.

10. A method of manufacturing a turbine blade ring which comprises providing blades having integral roots at both ends, including milling the end surface of one root to plane form, placing the blades between clamping rings in the desired relative position, bringing the milled end surfaces in engagement with a face plate, producing dovetails or the like on the exposed roots, bringing a strengthening ring in engagement with said dovetails, sealing the strengthening ring in said engagement by a rolling or pressing operation, turning the clamping rings so as to bring said strengthening ring in engagement with the face plate, forming dovetails on the roots now exposed and securing a strengthening ring to said dovetails by a rolling or pressing operation.

11. A method of manufacturing a turbine blade ring which comprises providing blades having integral roots at both ends, including milling the end surface of one root to plane form, placing the blades between clamping rings in the desired relative position, inserting washers between the clamping rings and the blades, bringing the milled end surfaces in engagement with a face plate, producing dovetails or the like on the exposed roots, bringing a strengthening ring in engagement with said dovetails, sealing the strengthening ring in said engagement by a rolling or pressing operation, turning the clamping rings so as to bring said strengthening ring in engagement with the face plate, forming dovetails on the roots now exposed, and securing a strengthening ring to said dovetails by a rolling or pressing operation.

12. A method of manufacturing a turbine blade which comprises subjecting a blank to a pressing action of such a nature as to form integral roots at both ends of the blank laterally projecting to one side thereof, to give the surface of the blank situated between said projecting roots as well as the adjacent inner surfaces of the roots their final shape, and to roughly form the remaining surfaces of the blade, subjecting the surface of the blade opposite to the surface finished by the pressing operation to a milling operation while causing the blade to rest upon said finished surface, at the same time milling the longitudinal edges of said surface to fix the width of the blade, and milling the end surface of one root to plane form, while causing the blade to rest on the inner surface of said root in order to fix the longitudinal dimension of the root.

In testimony whereof we have signed our names.

OSCAR ANTON WIBERG.
JOHN NORDIN.